United States Patent [19]

Brooks

[11] Patent Number: 5,025,337
[45] Date of Patent: Jun. 18, 1991

[54] RECIRCULATING AIR FILTER SYSTEM FOR ROTATING DISK DRIVES

[75] Inventor: Peter E. Brooks, Rochester, Minn.

[73] Assignee: International Business Machines Corporation, Armonk, N.Y.

[21] Appl. No.: 334,669

[22] Filed: Apr. 6, 1989

[51] Int. Cl.$^5$ ............................................. G11B 33/19
[52] U.S. Cl. ................................................. 360/97.03
[58] Field of Search ........................... 360/97.02, 97.03

[56] References Cited

U.S. PATENT DOCUMENTS

| 4,268,878 | 5/1981 | Kearns | 360/97.02 |
| 4,594,626 | 6/1986 | Frangesh | 360/97.02 |
| 4,636,891 | 1/1987 | Barski | 360/97.02 |

FOREIGN PATENT DOCUMENTS 62-279588 12/1987 Japan ............... 360/97.02

Primary Examiner—A. J. Heinz
Attorney, Agent, or Firm—Robert W. Lahtinen

[57] ABSTRACT

A recirculating filter system is provided for a sealed magnetic disk drive by providing a cartridge housing that mounts a filter medium closely adjoining the disk stack and substantially concentric therewith. The frame that mounts the filter medium also serves as a baffle or diverter to deflect air impelled by rotation of the disks to the rear of the filter medium. The remaining sides of the housing contact the cover or enclosure to define a dead box behind the filter medium wherein the velocity head of the air flow is converted to a potential head. Air impelled along the surface of the medium, at the side confronting the disk stack, provides some aspiration. A plenum formed at the radial outward side of the filter medium enables effective use of the entire medium surface. The recirculating air filter cartridge is not only compact within a corner of the cover or enclosure, but also is easily manufactured as a result of the simple filter medium configuration.

5 Claims, 3 Drawing Sheets

RECIRCULATING AIR FILTER SYSTEM FOR ROTATING DISK DRIVES

BACKGROUND OF THE INVENTION

Rigid disk magnetic storage units have little tolerance for particulate matter that is present in the atmosphere within the sealed head-disk enclosure. With heads that fly above the data surface at 15 microinches, a one micron particle is three times the distance separating the head and disk surface and will result in a head crash, damage to the disk surface or both. As data areal densities are increased, this problem becomes progressively more acute as the magnetic coatings become thinner and more fragile and the head is required to fly closer and closer to the disk surface. Although the drive is assembled and sealed in a clean room, it is necessary to scavenge the residual contamination and continue to filter from the atmosphere any particulate contamination that may be generated within the enclosure during the life of the device.

Frequent air changes through a filter capable of removing damaging particulate matter are necessary to maintain an atmosphere that can sustain error free operation. This is increasingly difficult to achieve as the number of disks is increased, the electronic control is enhanced and the overall dimensions of the file are effectively limited by the industry standard form factor.

SUMMARY OF THE INVENTION

The recirculating filter apparatus provides a frame that concentrically mounts the filter medium closely adjoining the disk stack with the frame also serving to deflect air from the periphery of the disk stack to the rear of the filter medium. The filter apparatus or cartridge is arranged to provide a substantially enclosed path between the inlet, which is at the side of the frame at which locations on the periphery of the disks approach the cartridge during rotation and the outlet through the filter medium. The air velocity induced by the rotation of the disks is converted to a potential head at the rear of the filter while the air flow across the face of the filter produces a low potential head at the outlet surface of the filter medium thereby inducing a large filtered air flow for a given filter area.

The structure of this filtering system is compact and may be included in a small extension of a drawn cover element as illustrated in the embodiment that is shown and described. Further, flow occurs from the back side of the filter medium and radially inward toward the disks. The air flow is not circulated about actuators, magnets or other parts that are most prone to be the source of undesirable particulate matter, especially magnetically active particles and thereby assists in controlling the rate of particle generation. Particle entrapment occurs in the dead box area at the rear of the filter and disk exposure to particle release induced by vibration or air currents is reduced. The ability to utilize a simple sheet of filter media is also conducive to low cost and design compactness.

DETAILED DESCRIPTION

Figure 1:
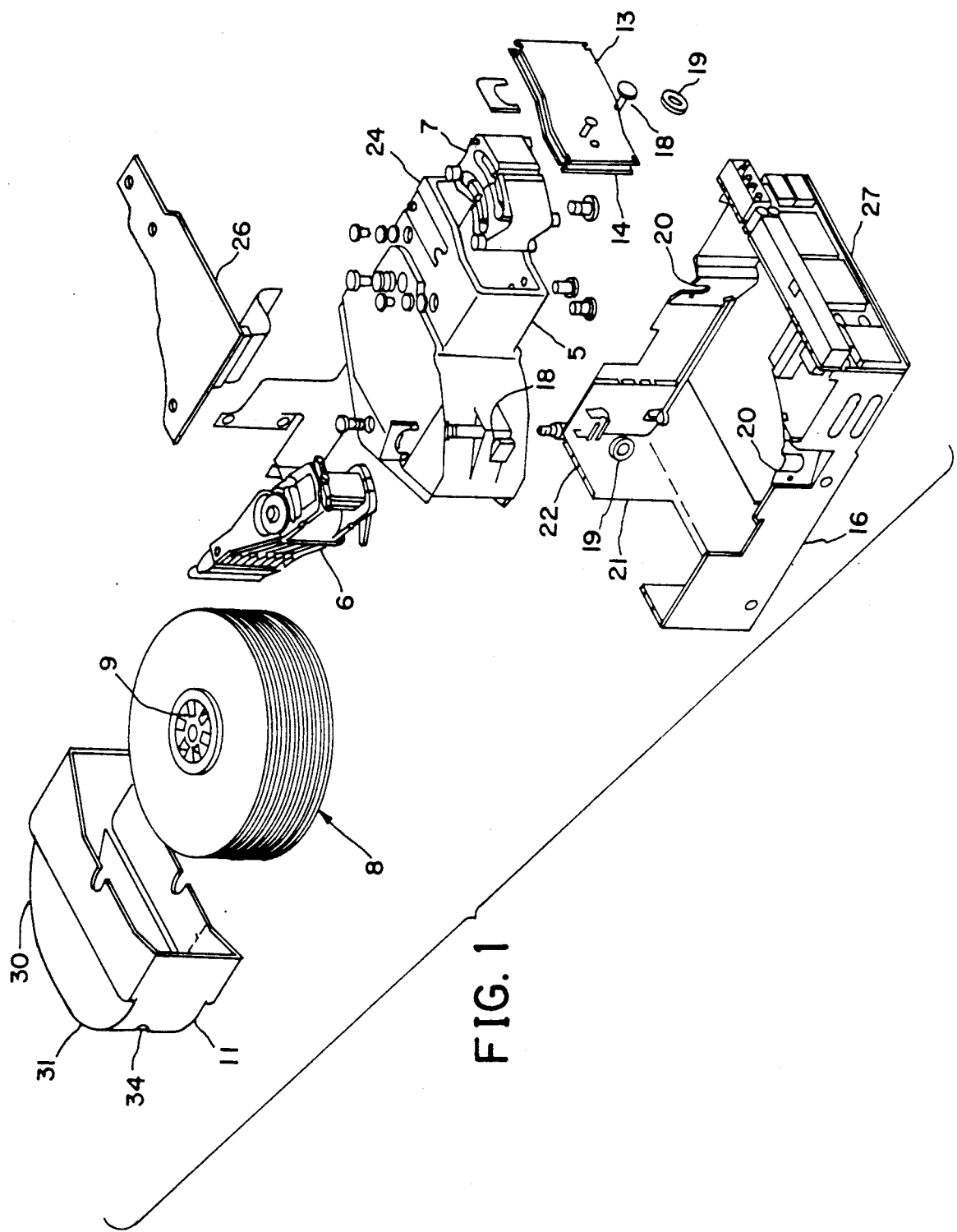
FIG. 1 is an exploded view of a rigid magnetic disk drive which incorporated the recirculating air filtration system and the filter cartridge of the present invention.

FIG. 1 illustrates a disk drive wherein a base casting 5 supports a rotary actuator 6 and the cooperating magnet-pole piece assembly 7 and the spindle assembly 8 which includes the disk stack and a concentrically mounted motor within hub 9. At the end of casting 5 from which the disks protrude the enclosure is completed by a drawn metal cover 11 and at the end adjoining the voice coil motor magnet assembly 7, a cover 13 and gasket 14 complete the head-disk enclosure. The enclosure is effectively sealed with the exception of a breather filter (not shown) which is provided to allow equalization of pressure resulting from thermal change or variations in atmospheric pressure. The conventional practice is to place the breather filter to access a location of lowest pressure within the head-disk enclosure to assure that any undesired leakage through a gasket or otherwise occurs out of the enclosure with the result that only air filtered through the breather filter enters the enclosure. The head-disk assembly is shock mounted in a frame 16 by three projections 18 that are respectively surrounded by elastomer elements 19 and received three respective slotted openings 20. The compactness of the drive design may be appreciated by the fact that the frame has a cutout portion 21 in the end wall 22 of frame 16 to accommodate the end of head-disk enclosure cover 11 and a reduced height at both the top and bottom of the casting portion 24, that surrounds the actuator voice coil motor, to enable upper and lower circuit cards 26, 27 to extend the full width of the frame 16.

Cover 11 has a substantially cylindrical side wall portion 30 which closely confines the disk stack and a more deeply drawn side wall portion 31 in the quadrant which receives and supports the filter cartridge 33. An aperture 34 is provided in cover 11 to receive a stud 35 on the air filter cartridge 33 to position and support the cartridge.

Figure 2:
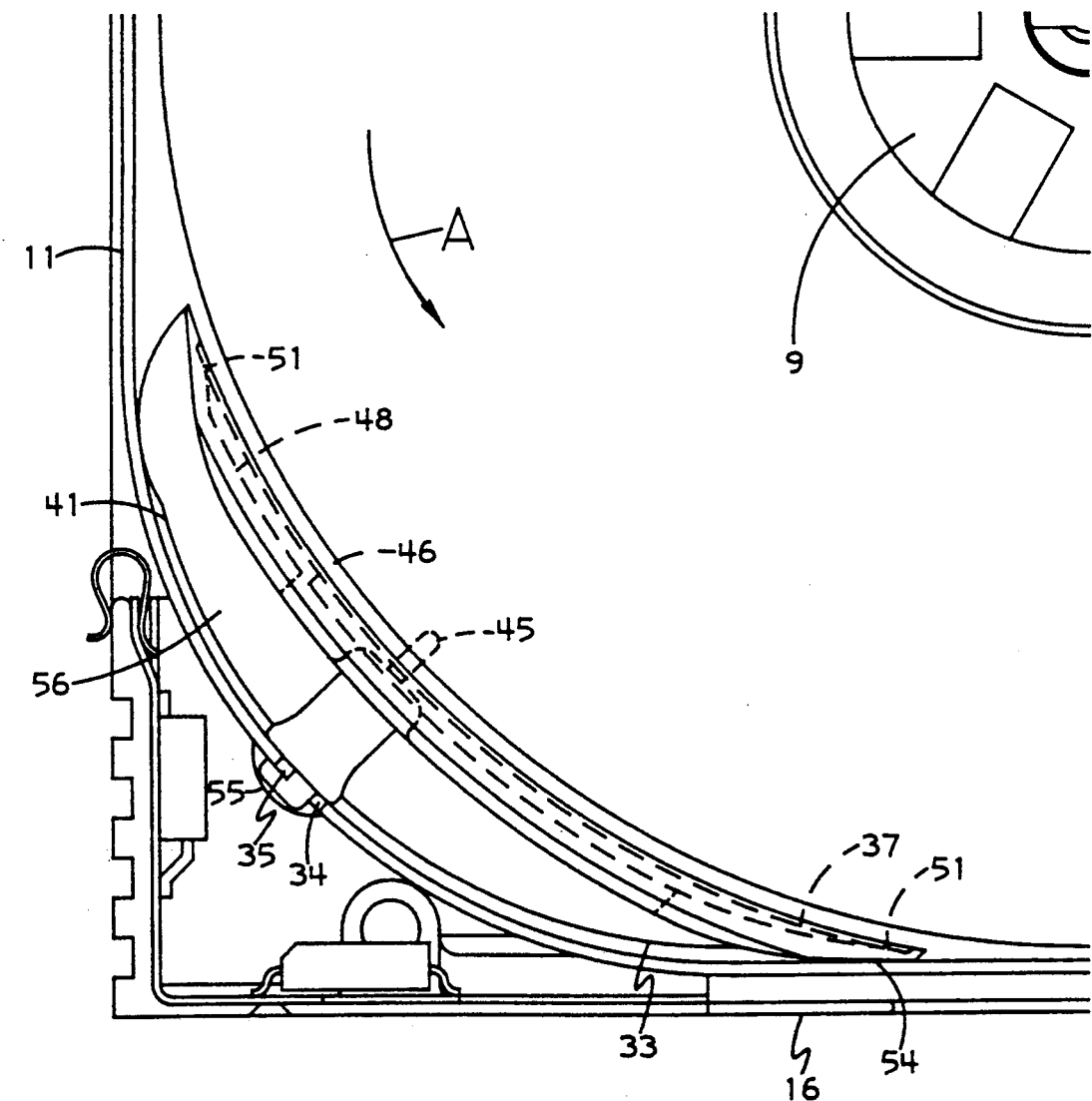
FIG. 2 is a partial section view of the disk drive of FIG. 1 showing the recirculating air filter cartridge mounted within the drawn metal cover.
Figure 3:
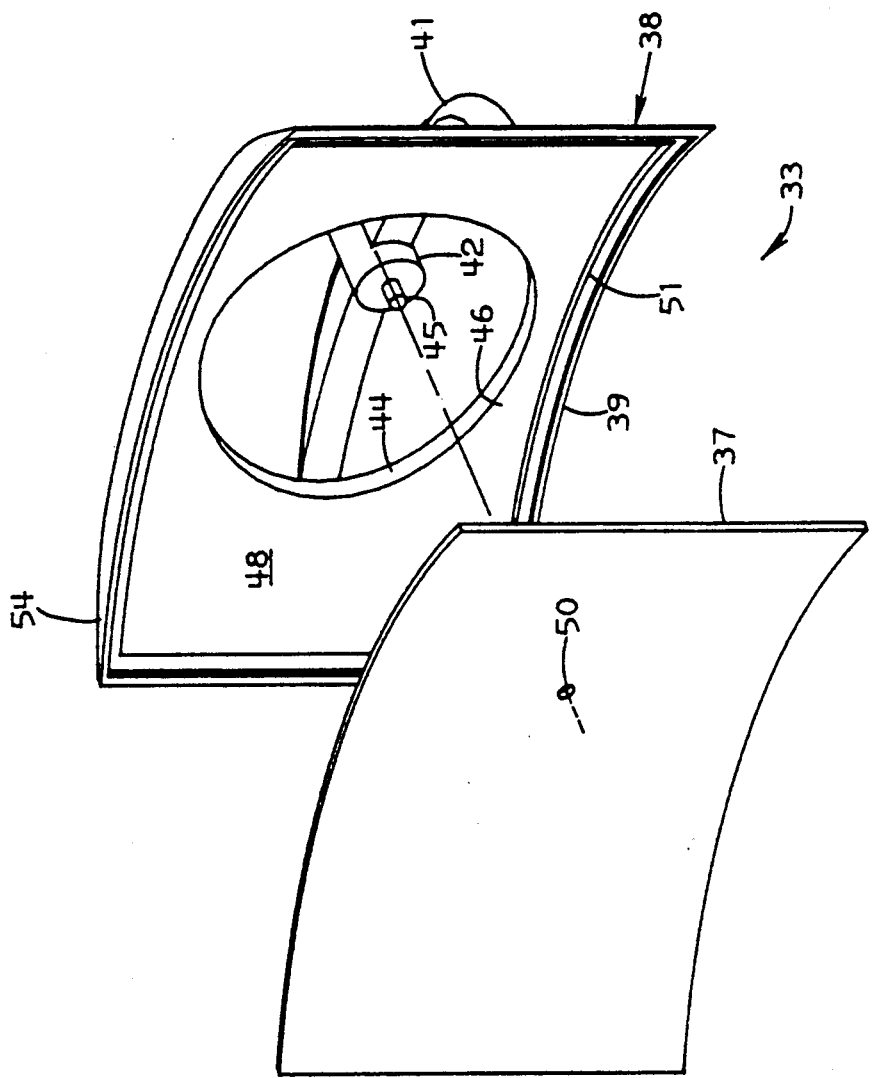
FIG. 3 illustrates the filter cartridge with the filter medium separated from the housing.

The recirculating filter cartridge 33 is shown with filter medium 37 removed in FIG. 3 and in the assembled condition within the cover 11 in FIG. 2. The cartridge 33 includes a housing 38 that presents a frame 39 which defines a segment of a cylinder and to which is attached the filter medium. Attached to the housing 38 is a stiffener rib 41 which carries a rib boss 42 that has studs 35, 45 projecting therefrom. A large aperture 44 provides access to the plenum 46 that the wall 48 forms behind the filter medium 37. The plenum 46 immediately behind the filter medium 37 allows full use of the exposed medium. The small stud 45 projects through the medium hole 50 to locate the filter medium 37 prior to bonding to the frame 39 within the recess and along the bead 51. The raised bead 51 is an energy concentrator used in ultrasonically attaching the filter medium 37 to the housing 38.

FIG. 2 shows the filter cartridge 33 in the assembled condition within the cover 11. The housing fits against the upper and lower cover walls and along one surface 54 is in abutment with the cover side wall. The air passage inlet is provided at the opposite side of the housing where the stiffener rib 41 abuts the cover interior wall surface. The frame 39 extends along the periphery of the disk stack 8 and serves as a baffle that diverts air flow induced by the impeller action of the rotating disks into the dead box area 56 at the rear of the cartridge. The cartridge is positioned and aligned by the stud 35 which is received in the cover opening 34. When the cartridge 33 is in the assembled condition, a drop of epoxy 55 is applied to the end of the stud 35 to secure the cartridge 33 in position and seal the opening 34 in the cover 11 to complete the seal of the head-disk enclosure.

During operation, the disk assembly 8 rotates in the direction of arrow A to produce an impeller action that imparts an outward velocity to the air along the disk surfaces. The high kinetic energy air flow is directed into a dead box 56 formed by the housing and the interior surface of cover. The reduction of air speed within the dead box volume converts the velocity head to a potential head. The magnitude of the potential head is proportional to the square of the initial velocity, thus the higher the air velocity, the more effective is the air filtration system. Another portion of the air flow induced by disk rotation passes along the front surface of the filter medium and affords an aspirating effect to further enhance the recirculating air filtration system.

While the invention has been particularly shown and described with reference to a preferred embodiment, it will be understood by those skilled in the art that various changes in form and details may be made therein without departing from the spirit and scope of the invention.

What is claimed is:

1. A magnetic disk drive having a plurality of disk media mounted as a disk stack for rotation in unison about a common axis and a head-disk enclosure closely surrounding at least a portion of the periphery of said disk stack comprising
   a baffle presenting a surface substantially concentric with and adjoining the periphery of said disk stack said baffle having a leading edge proximate to the periphery of said disk stack where said disks rotate toward said baffle;
   an inlet opening between said baffle and said enclosure near said leading edge;
   an outlet opening in said concentric baffle surface; and
   a filter medium mounted across said outlet opening, whereby a recirculating air filter path is established from said inlet opening to said outlet opening and through said filter medium.

2. The magnetic disk drive of claim 1 further comprising a housing of which said baffle forms a portion and wherein said housing is mounted on said head-disk enclosure.

3. The magnetic disk drive of claim 2 wherein said enclosure includes a cover which extends about portions of each axial end of said disk stack and said housing is carried by said cover.

4. In a magnetic disk drive having a plurality of disk media mounted as a disk stack that is rotated about an axis within a sealed enclosure, a recirculating filter system comprising
   a filter medium having a radially inward surface substantially concentric with and closely adjoining the periphery of said disk stack;
   a frame mounted on said enclosure upon which said filter medium is supported;
   an opening providing a passage between the disk stack and the radially outward surface of said medium near an edge of said medium where locations on the periphery of said disks approach said medium during disk stack rotation;
   said enclosure including a cover which extends about portions of each axial end of said disk stack, said frame being carried by said cover; and
   a housing which carries said frame and provides a plenum at the radial outward side of said filter medium;
   said housing further carrying a stud received in an aperture in said cover to position and align the housing in cooperation with the cover interior wall surfaces.

5. The magnetic disk drive of claim 4, wherein said housing includes a second stud, said filter medium includes an aperture in a central portion thereof and said second stud is received in said filter medium aperture to align and support said medium.

* * * * *